H. F. BOND.
Machine for Creaming Milk.
No. 220,516. Patented Oct. 14, 1879.
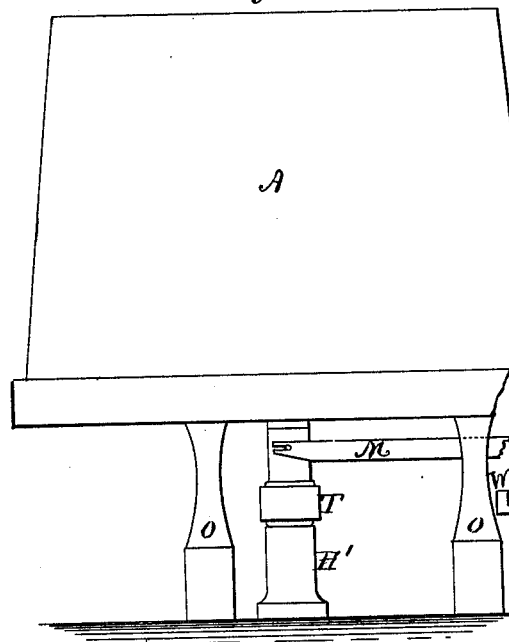
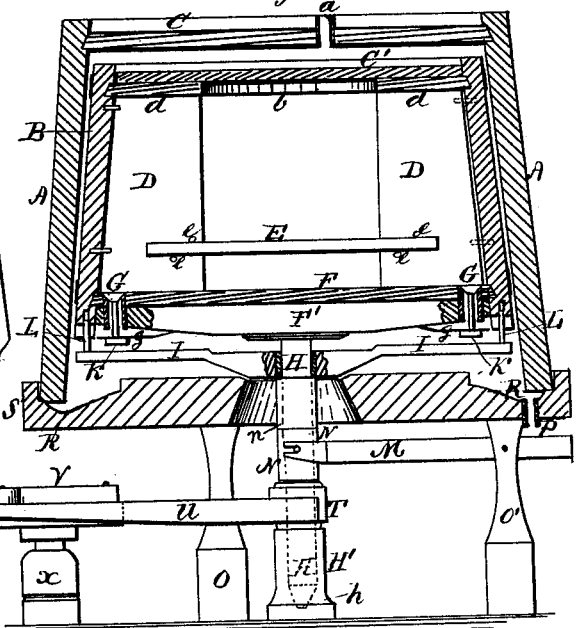
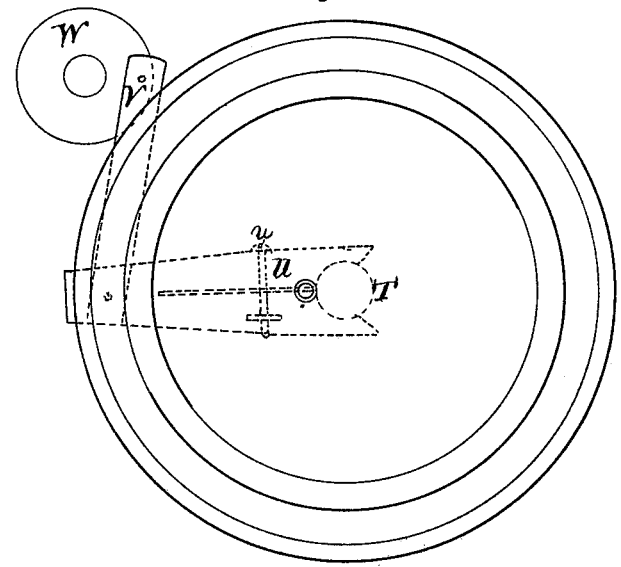
Witnesses.
L. H. Latimer.
Thomas Lally.
Inventor.
Henry F. Bond
by J. H. Adams, atty

UNITED STATES PATENT OFFICE.

HENRY F. BOND, OF NORTHBOROUGH, MASSACHUSETTS.

IMPROVEMENT IN MACHINES FOR CREAMING MILK.

Specification forming part of Letters Patent No. 220,516, dated October 14, 1879; application filed November 29, 1878.

*To all whom it may concern:*

Be it known that I, HENRY FREDERIC BOND, of Northborough, in the county of Worcester and State of Massachusetts, have invented a new and useful Improvement in Machines for Creaming Milk and Churning, of which the following is a specification.

My invention relates to certain improvements in machines for separating cream from milk, in which the separation is effected by means of centrifugal force; and the invention consists in a peculiar means of cooling the milk while undergoing the operation of separation from the cream in its fresh state. It also consists in a means of drawing off the milk after separation from the cream while the machine is in full operation, whereby a larger proportion of cream is obtained than if the machine were gradually stopped and the cream skimmed off while the machine is at rest.

Referring to the drawings, Figure 1 represents an elevation of a machine embodying my invention. Fig. 2 is a vertical section of the same, and Fig. 3 is a top view of the same.

The machine in which my improvements are embodied is similar in its main construction to that shown and described in Patent No. 195,515, granted September 25, 1877.

B represents a drum, shown as of tapering form, but may be cylindrical, and is firmly supported on a central spindle, H, which is stepped in the socketed projection H', so that the said drum may be freely rotated. The top of the drum has a flange, $d\ d$, extending around its inner circumference, leaving a circular aperture, $b$, at the center, over which is placed the cover C', which is designed to close the opening $b$ of the drum B when necessary.

D D are partitions extending from the bottom of the drum B to the flange $d\ d$, and are held in position by means of a brace or cross-piece, E, which is slotted at each end, and held by pins $e\ e$, the slotted ends passing at each side of the partitions, and so arranged that the said brace may be readily applied and detached for the removal of the partitions when required.

At opposite sides of the bottom F of the drum B are arranged two valves, G G, opening upward. The stems of these valves pass through openings in the bottom of the drum B, and are connected to springs $g\ g$, secured to the under side of the bottom of the brace or cross-piece F', so as to retain the valves G G in a closed position, the lower ends of the said valve-stems being provided with nuts or bearings $k\ k$, against which the springs $g\ g$ act.

I I represent a bar extending across underneath the drum, and attached at its center to a collar or sleeve, $n$, which extends downward and rests upon the sleeve N, and is fitted to move freely on the shaft H, with which it rotates. The outer ends of the bar I I are provided with pins L L, fitting in corresponding holes in the lower edge of the drum, and serving as guides for the said bar.

The valves G G are opened by means of the bar I I, which is raised by elevating the collar or sleeve N, surrounding the shaft H, upon which it is made to move up and down by means of a lever, M, which is provided with forked ends, embracing the sleeve N and fulcrumed to the support O'. As the shaft H rotates freely in the sleeve N, it will be seen that the valves G G can be opened while the drum B is in rapid rotation.

On opening the valves the milk, after being separated from the cream, will pass out into the groove or trough R in the platform S, and from thence it passes out through the opening P to any convenient receptacle.

The drum B is surrounded and covered by a casing, A, the top of which is represented at C, and supported upon the stationary platform S. A space is left between the top C' of the drum B and the upper part, C, of the casing, and in the top C of the casing is an opening, $a$. The object of this opening is to provide for the admission of water from any suitable source of supply, which, passing through the opening $a$ and falling upon the drum, the opening $b$ of which is to be covered, is caused, by the rapid rotation of the latter, to assume the form of spray, covering the top and passing down the sides of the drum, thus enveloping the whole drum and imparting a cooling effect to the contents of the same—an important consideration when fresh milk is to be operated upon.

The water falls into the trough R and is conducted off through the opening P. The platform S is supported upon standards O, of which there may be three or more.

After the milk has all been drawn off the valves G G are closed, and the cream remains to be churned, which is effected in the following manner: To the shaft H is secured a hub, T, as shown in Fig. 2, to which is attached a slotted bar, U, provided with jaws, that are caused to gripe the said hub by means of a screw, *u*, as shown in dotted lines in Fig. 3. To the outer end of the bar U is attached a pitman, V, which is connected to a wheel or pulley, W, in such a manner that as the said wheel is rotated a reciprocating motion will be imparted to the bar U, which, in turn, causes the drum B to be partially rotated with a reciprocating motion. Motion is imparted to the wheel W by a belt from any convenient power.

It will be observed that the bar U is only used when the drum B is employed as a churn, and motion is imparted to the drum B for separating the milk and cream by means of a belt around the hub T from any convenient power.

It may be advisable, under some circumstances, to interpose some filtering substance between the interior of the drum and the valves to assist in retaining the cream while the rest of the milk is being discharged.

What I claim as my invention, and desire to secure by Letters Patent, is—

1. In a centrifugal creaming-machine, substantially such as described, the casing A, the cover C of which is provided with an opening, *a*, in combination with a rotating drum, B, as and for the purpose specified.

2. The combination, with the drum B, of valves G G, operated by means of a bar, I I, in connection with a lever, M, and the sleeve surrounding the shaft H, so that the milk when separated from the cream can be discharged from the drum while the latter is in rapid rotation, substantially as set forth.

In testimony whereof I have signed my name to this specification in the presence of two subscribing witnesses.

HENRY F. BOND.

Witnesses:
J. H. ADAMS,
THOMAS LALLY.